United States Patent [19]

Krick

[11] Patent Number: 5,726,921
[45] Date of Patent: Mar. 10, 1998

[54] FLOATING POINT POWER CONSERVATION

[75] Inventor: Robert F. Krick, Beaverton, Oreg.

[73] Assignee: Intel Corporation, Santa Clara, Calif.

[21] Appl. No.: 579,080

[22] Filed: Dec. 22, 1995

[51] Int. Cl.⁶ ........................................... G06F 1/32
[52] U.S. Cl. ........................... 364/707; 395/750.04
[58] Field of Search ........................ 364/707, 748; 395/750

[56] References Cited

U.S. PATENT DOCUMENTS

| | | | |
|---|---|---|---|
| 4,418,969 | 12/1983 | Matsuzaki et al. | 395/750 |
| 5,392,437 | 2/1995 | Matter et al. | 395/750 |
| 5,420,808 | 5/1995 | Alexander et al. | 364/707 |
| 5,586,332 | 12/1996 | Jain et al. | 395/750 |
| 5,603,037 | 2/1997 | Aybay | 395/750 |

*Primary Examiner*—Chuong Dinh Ngo
*Attorney, Agent, or Firm*—Blakely, Sokoloff, Taylor & Zafman

[57] ABSTRACT

An apparatus comprising floating point circuitry and first logic coupled to at least one flag in a processor control register (e.g. one of the control registers in the Intel Architecture brand processor or a processor compatible therewith) and the floating point circuitry and for coupling to a clock which drives the floating point circuitry. The first logic allows the clock to clock the floating point circuitry when the at least one flag has a first state. The first logic further prevents the clock from clocking the floating point circuitry when the at least one flag has a second state.

4 Claims, 5 Drawing Sheets

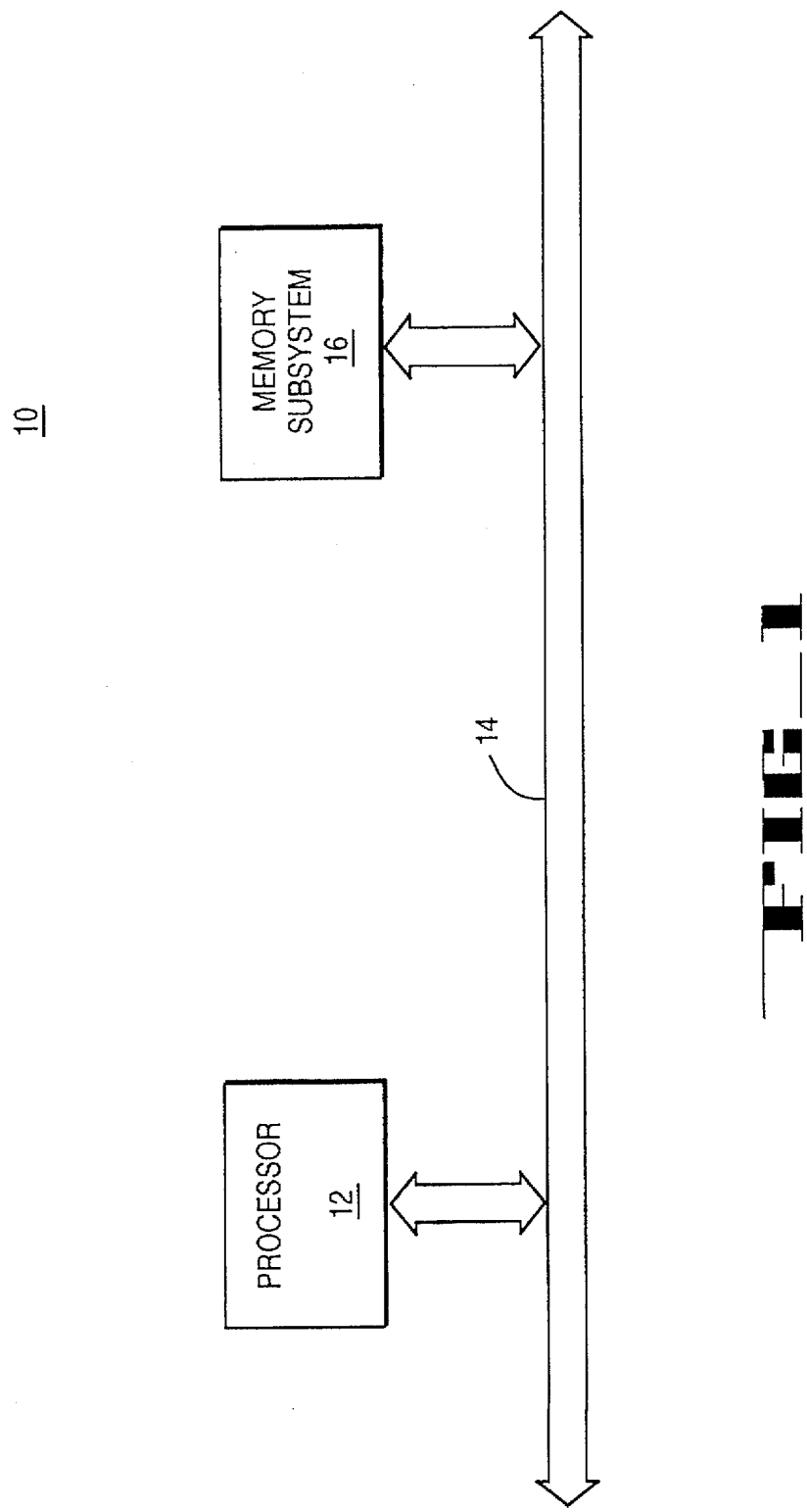

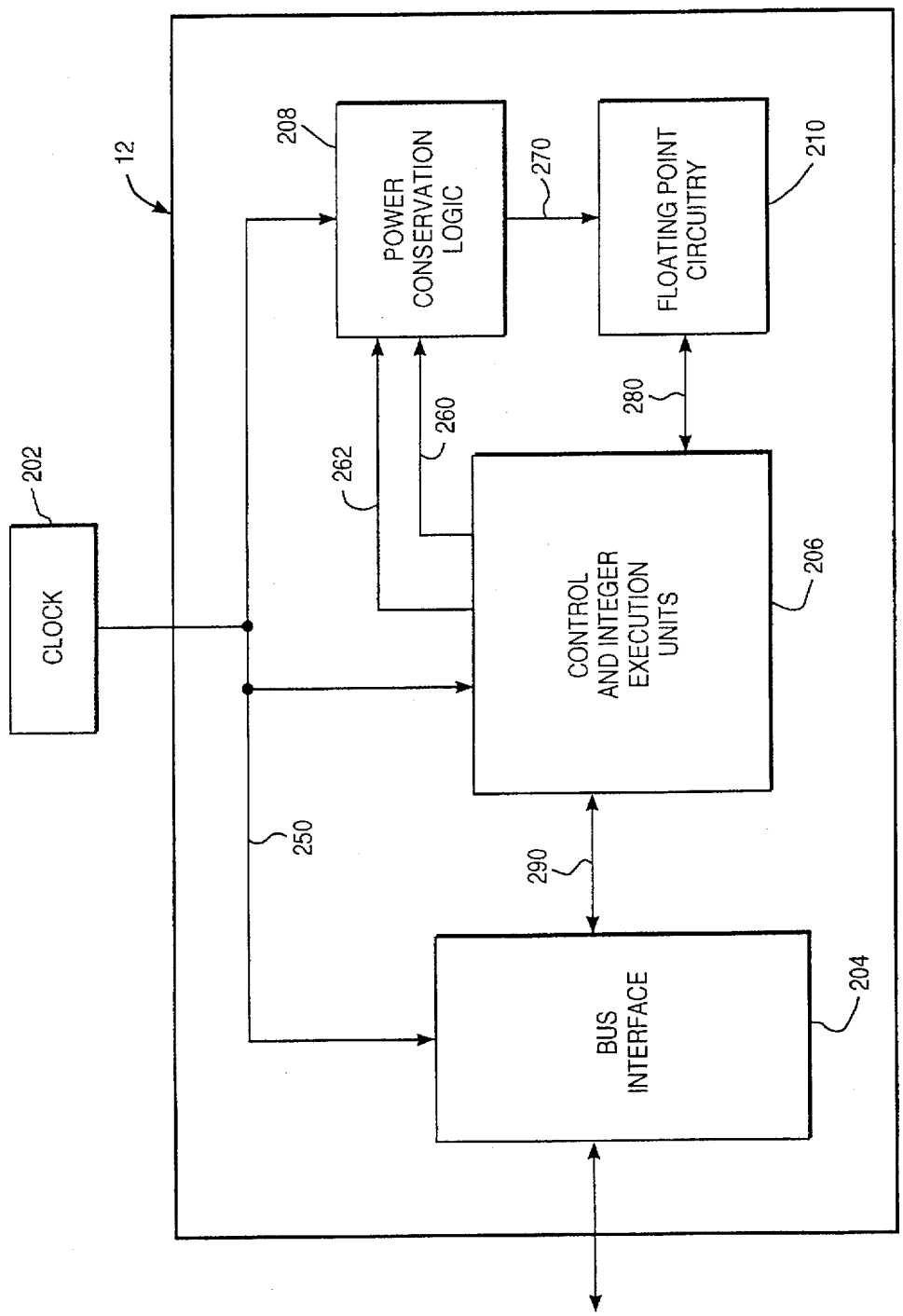
FIG_2

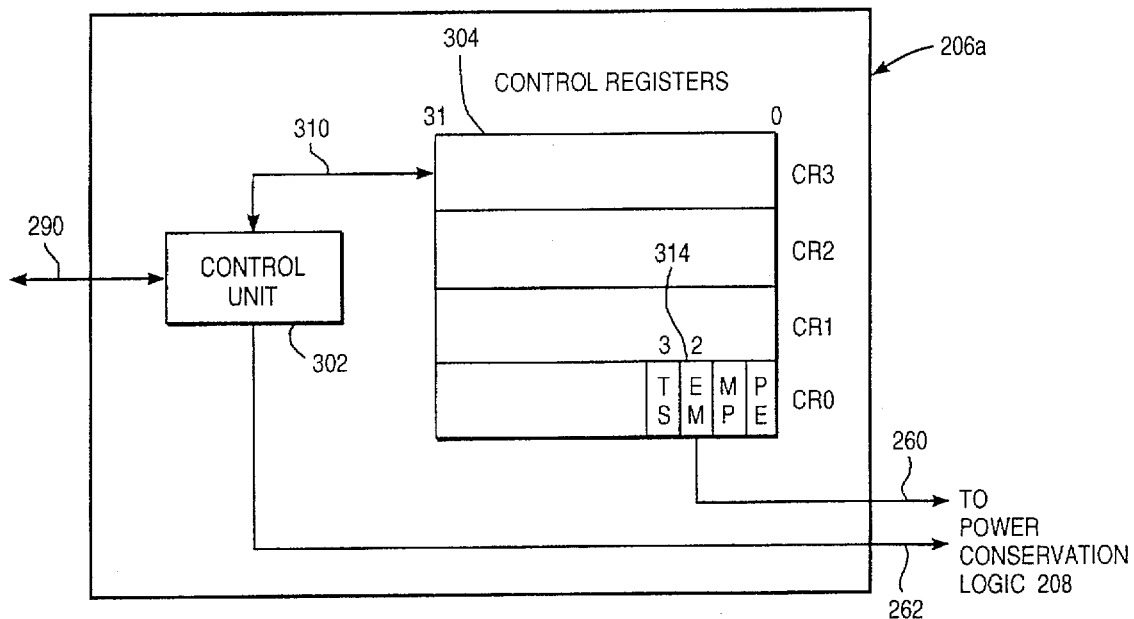
FIG_3
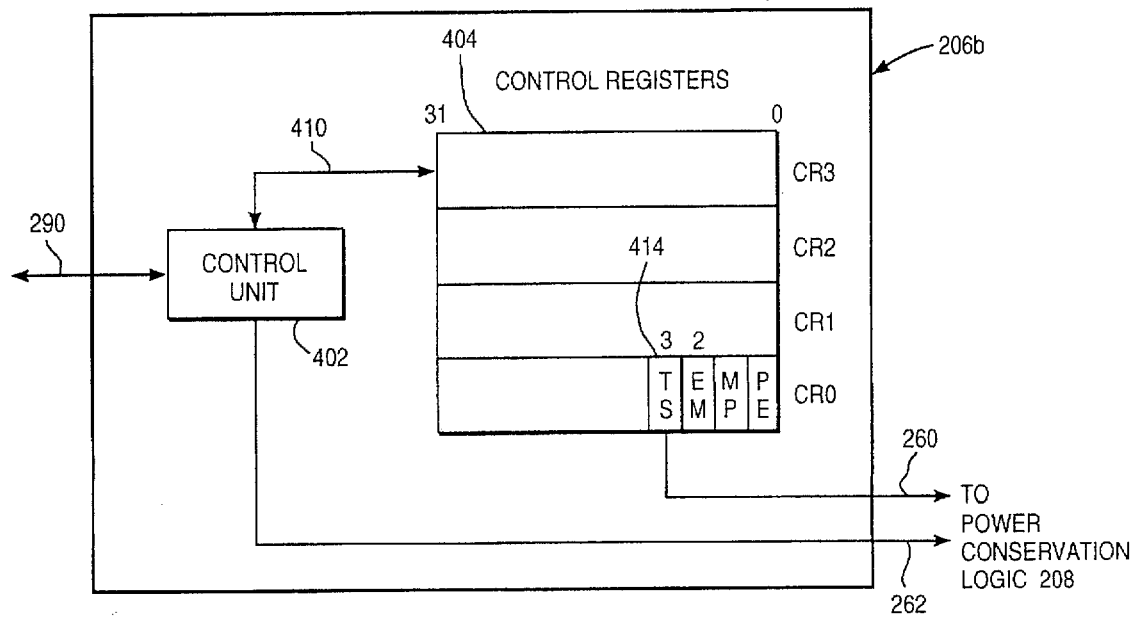
FIG_4

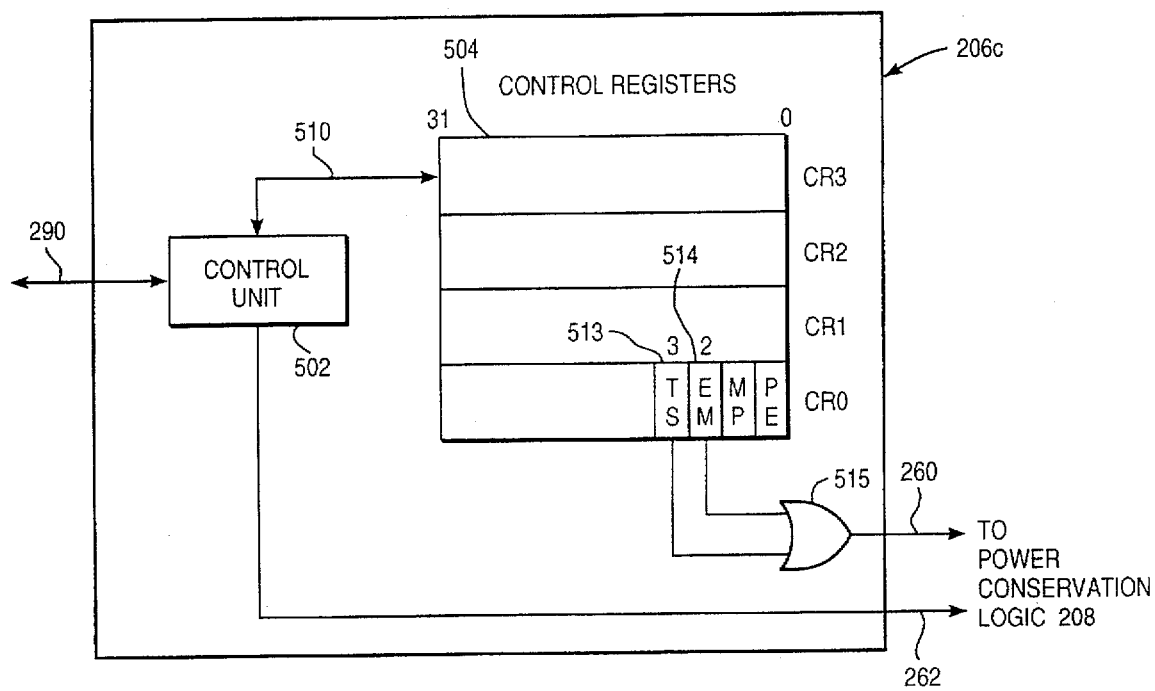
FIG_5

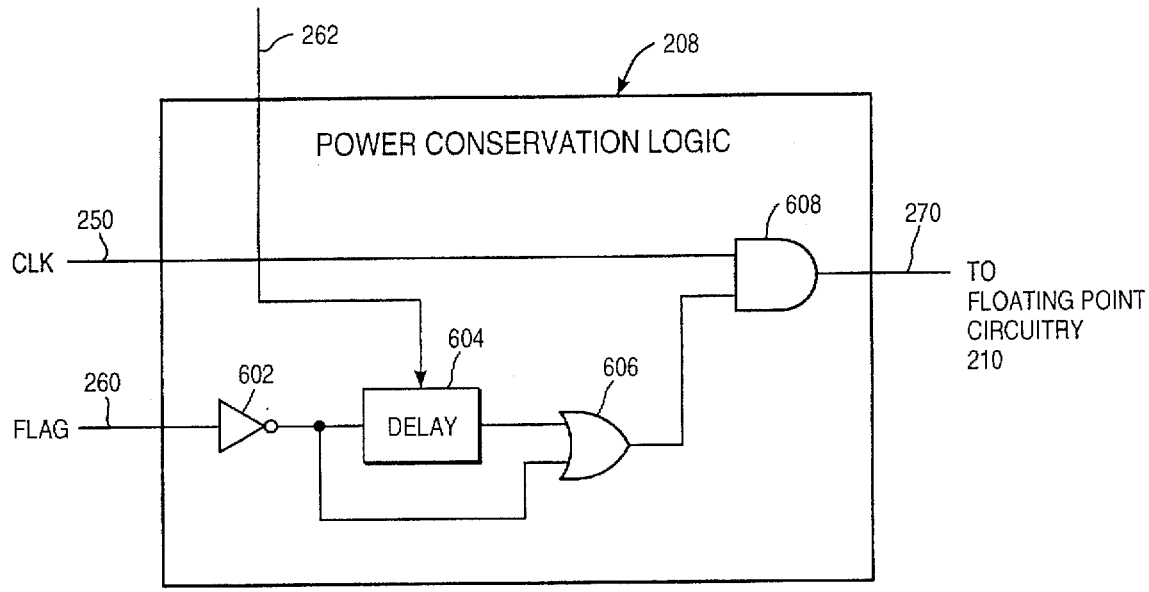
FIG_6
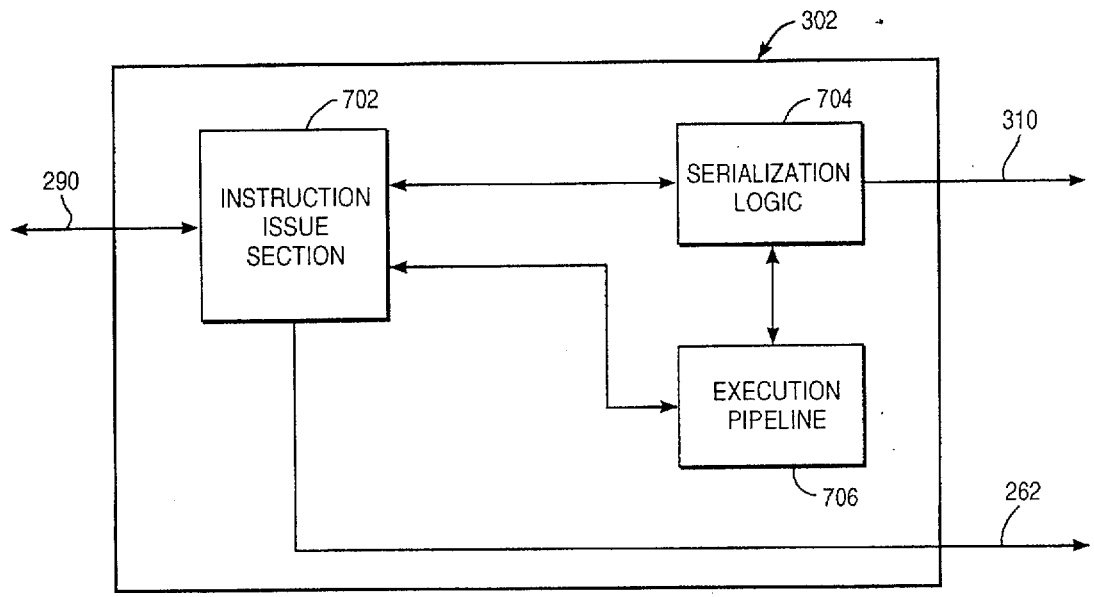
FIG_7

FLOATING POINT POWER CONSERVATION

BACKGROUND OF THE INVENTION

1. Field of the Invention

The present invention relates to power conservation. Specifically, the present invention relates to a method and apparatus for deactivating a clock to floating point circuitry, for example, in a processor or a computer system, when floating point operations are not required.

2. Background Information

Power conservation is increasingly becoming a concern in both computer system and processor design. Due to the proliferation of portable or so-called "laptop" computers, environmental concerns, and other design considerations, almost uniformly, designers are seeking more and more opportunities to reduce power consumption by both processors and computer systems.

Prior an solutions to power consumption problems have included the release of processors which operate at lower power levels. Other solutions have included modes which deactivate system power to components in a computer system when not in use. For example, if a fixed-media or hard-disk drive in not accessed for a certain period of time, the drive may be spun down. If a system remains idle, its monitor may be dimmed or its processor may be put to "sleep". In yet other prior an solutions, the entire system may be put to "sleep" (e.g. deactivated) if there is inactivity for a predetermined time period. Myriad other solutions have been and are being developed which address these needs.

One feature provided in state of the art processors is the availability of floating point operations. In early designs, because of processor design complexity, such features were provided via a separate co-processor (e.g. the Intel brand Intel287™ and Intel387™ co-processors available from Intel Corporation of Santa Clara, Calif.), which was only installed in a computer system if the user desired. In modern processors, such as the Intel486SX™ (except for the Intel 486SX) and Pentium® brand processors available from Intel, such floating-point functionality has been provided in the main processor.

Many applications do not use floating point operations on a regular basis. Notwithstanding, modern processors such as these continue to clock the floating point circuitry, even though no floating point operations are being executed or floating point registers are in use. Although power-saving versions of these processors continue to be developed and made available, prior art solutions to reduce power consumption have been lacking, especially due to the unnecessary operation of certain circuitry in a processor or co-processor in a computer system.

Thus, the prior art of power conservation, in processor and computer system design, suffers from deficiencies.

SUMMARY

An apparatus comprising floating point circuitry and first logic coupled to at least one flag in a processor control register (e.g. one of the control registers in the Intel Architecture brand processor or a processor compatible therewith) and the floating point circuitry and for coupling to a clock which drives the floating point circuitry. The first logic allows the clock to clock the floating point circuitry when the at least one flag has a first state. The first logic further prevents the clock from clocking the floating point circuitry when the at least one flag has a second state.

In implemented embodiments, the at least one flag may include an emulation flag, for example, as defined by the Intel Architecture brand processor, which indicates that floating point operations should be emulated in the processor. It may also include a task switch flag. In yet another embodiment the at least one flag includes the task switch flag and an emulation flag which indicates that floating point operations should be emulated in the processor, and the first logic includes a logical OR between the task switch flag and the emulation flag.

The floating point circuitry may include a floating point execution unit and/or floating point registers and execution units in an out-of-order processor. The floating point circuitry may also include a co-processor. The apparatus may further be resident itself in the processor.

A delay may be coupled to the flag for delaying the second state on the flag for a time period prior to the preventing the clock from the clocking of the floating point circuitry. Serialization logic may also be included in the apparatus for preventing the at least one flag from being modified to the second state if a subsequent instruction will require use of the floating point circuitry.

BRIEF DESCRIPTION OF THE DRAWINGS

The present invention is illustrated by way of example and not limitation in the figures of the accompanying in which like references indicate like elements and in which:

FIG. 1 illustrates a block diagram of a processor and memory subsystem in a typical computer system.

FIG. 2 illustrates a block diagram of a processor which includes floating point power conservation logic, floating point circuitry and other circuitry.

FIG. 3 illustrates a more detailed view of a first embodiment of the processor circuitry shown in FIG. 3.

FIG. 4 illustrates a more detailed view of a second embodiment of the processor circuitry shown in FIG. 3.

FIG. 5 illustrates a more detailed view of a third embodiment of the processor circuitry shown in FIG. 3.

FIG. 6 illustrates a detailed view of power conservation logic used in implemented embodiments of the present invention.

FIG. 7 illustrates an example of a serialization circuit which is resident in a processor.

DETAILED DESCRIPTION

Implemented embodiments of the present invention include a method and apparatus in a processor or a microprocessor which conserves power. Although the present invention will be described with reference to certain specific embodiments thereof, including circuits, systems, etc., it can be appreciated by one skilled in the art that these specific details are disclosed herein for a complete understanding of the present invention, and do not limit its scope. It can be appreciated by one skilled in the art that many departures and other modifications of the implemented embodiments of the present invention may be performed by one skilled in the art. This invention can be practiced without these specific details.

FIG. 1 illustrates a computer system 10 which includes a processor 12 and a memory subsystem 16. The processor 12 and the memory subsystem 16 communicate over a host bus 14. The processor 12 and memory subsystem 16 communicate commands and instructions over bus 14 to provide functionality.

FIG. 2 illustrates a more detailed view of processor 12. Processor 12 is shown in simplified block diagram form. Processor 12 executes Intel Architecture processor instructions.

Processor 12 includes a bus interface 204 which is coupled and in communication with control and integer execution units 206. Bus interface 204 may be used for communication with other devices via bus 14, such as memory subsystem 16.

Control and integer execution units 206 are coupled via signal line 260 to power conservation logic 208. Power conservation logic 208 is coupled via clock line 270 to floating point circuitry 210.

Floating point circuitry 210 is coupled to power conservation logic 208 via clock line 270, and control and integer execution units 206 via lines 280 for communication with the remainder of the processor. Floating point circuitry 210 includes all circuitry which is necessary for executing floating point instructions (e.g. floating point execution unit(s)). Floating point circuitry 210 further includes all circuitry for generating and maintaining the floating point state (e.g. floating point registers).

In an in-order processor, floating point circuitry 210 may be present in a single unit on-chip. It may also be present in an external co-processor chip, such as the Intel387™. In an out-of-order processor where functionality may be distributed, it can be understood by one skilled that floating point circuitry 210 may include any execution unit(s), register(s), extended precision portions of bus drivers and receivers and other circuitry for generating, executing and maintaining the floating point state. For all intents and purposes, whether in a single chip or multiple chips, floating point circuitry is segregated.

Control and integer execution units 206 include all other circuitry which is normally present in a processor, such as an instruction decoder, cache(s), integer registers, integer execution units, etc . . . , except floating point circuitry 210, bus interface 204, and power conservation logic 208. All of the circuitry shown in FIG. 2 is clocked by a central clock 202, although it can be appreciated that different portions of the circuit may be clocked by different clocks, according to implementation. Note that regardless of the clocking mechanism used that the clock to is floating point circuitry 210 is controlled by power conservation logic 208.

FIG. 3 illustrates details of relevant portions of control and integer execution units 206 for the purposes of a first embodiment 206a of this invention. A control unit 302 is present in control and integer execution units 206 which controls the contents of registers 304, and performs certain actions based upon the contents of registers 304. Control registers 304 include control registers CR0, CR1, CR2, and CR3 which function according to an Intel Architecture processor standard.

Signal line 260 which is coupled to power conservation logic 208 is coupled to bit 2 of control register CR0, EM bit 314, in this implementation, which controls power conservation logic 208. EM bit 314 functions as a flag indicating that floating point instructions in the processor should be emulated because no floating point unit is available.

Signal line 262 provides a delay signal to power conservation logic 208 which varies the time in which the detection of a floating point power down condition takes place. In the instance of the floating point pipeline being empty, this time may vary according to the type of processor, operating conditions, etc.

FIG. 4 illustrates the details of a second embodiment 206b of the present invention. In this implementation, signal line 260 is coupled to the TS bit 414 in control register CR0.

FIG. 5 illustrates the details of a third embodiment 206c of the present invention. In this embodiment, either the TS bit 513 or the EM bit 514 is provided as the flag over signal line 260 by OR gate 515.

In multi-tasking operating systems, such as UNIX and Windows NT a "lazy" floating point context save/restore mechanism is used when task switching. In the Intel Architecture processor, this switching is accomplished by setting either the EM bit 314 or the TS bit 414 in control register CR0 when a task is switched. With this mechanism, the processor can save the "old" floating point state if the current process does not execute any floating point instructions.

When either the EM bit 314 or the TS bit 414 is set in CR0 after a task switch upon the execution of a floating point instruction in the Intel Architecture processor, a device not available (DNA) exception is generated. In this case, the operating system saves the current floating point context, the floating point context for the current process is restored, the appropriate bit is cleared, and the original floating point instruction which caused the DNA is re-executed. This technique is typically used in circumstances when most processes do not execute floating point instructions. In other architectures, the technique may be used in other circumstances.

Because these methods are used when no floating point instructions are being executed, implemented embodiments of the present invention use either the EM bit 314 or the TS bit 414 to control the power conservation logic and deactivate clocking of floating point circuitry.

Power conservation logic 208 is shown in one implementation in FIG. 6. Signal line 260 carrying the state of the flag, either the EM bit 314 or the TS bit 414, is input to an inverter 602. The output of inverter 602 is fed to a delay 604 and to an OR gate 606. Delay 604 delays the inverted state of the flag for a predetermined time. This time (or number of specified clocks) will vary according to implementation, but is generally the maximum time that it will take to save the floating point state during a task switch. This allows the logic to settle while the old floating point state is saved. This forces a latency prior to the deactivation of the floating point circuitry. This allows current implementations of task switching to remain unchanged. The delay can vary, according to implementation, as conditioned by the signal carried on signal line 262.

The flag carried on signal line 260 is input along with the delayed state of the flag from delay 604 to OR gate 606. The output of OR gate 606 is coupled to AND gate 608. AND gate 608 is also coupled to the clock signal line 250 which clocks floating point circuitry 210. Thus, floating point circuitry 210 can effectively be powered down when the flag is in one state (high, in this implementation) as delayed by the predetermined time of delay 604. In another implementation which does not require such a latency, the delay can be removed, and the signal line carrying the flag can be coupled directly to AND gate 608. Floating point circuitry 210 can be powered back up, resuming clocking immediately upon the flag changing to another state (low, in this implementation). Power is thereby conserved by deactivation of floating point circuitry 210 during intervals when it is not required for the execution of any instructions.

A final design consideration which should be taken into account is serialization of the setting of the flag. This may be implemented either in operating system routines or exception handlers which modify the flag, or in the processor itself. Again, circuitry which is resident in the processor itself avoids modification of existing software. In one implementation as illustrated in FIG. 7, serialization logic 704 in control unit 302 may be used for this purpose.

Serialization logic 704 ensures that updates of the flag are serialized with respect to floating point operations. Moreover, it ensures that the floating point circuitry 210 is not required for any other floating point operations which may be performed in the processor. In a pipelined in-order architecture processor, serialization logic 604 may simply check opcodes of any instructions which are currently being issued in the instruction issue section 702 of the processor, awaiting decoding or other intermediate stage of completion to determine whether an instruction will require use of floating point circuitry 210. This may include any instructions which require floating point units, but yet, may not be floating point instructions themselves (e.g. the IMUL instruction). Thus, if the serialization logic 704 detects a condition under which the flag should not be set, then any signals received from the execution pipeline 706 to set the flag will be overridden and blocked by serialization logic 704.

In another implementation, serialization logic 704 detects execution of a first instruction which requires execution of a subsequent institution requireing floating point circuitry 210. In this situation the flag will not be set.

In yet another implementation, in architectures which perform speculative out-of-order execution, various stages in the execution pipeline should also be checked to determine if floating point circuitry 210 is being used. Conceptually, serialization is the same, albeit, more complex because design considerations such as register renaming and other issues specific to such processors must be addressed.

Thus, in conclusion, an apparatus for conserving power in a computer system or processor has been described. Although the present invention has been described with reference to certain specific embodiments thereof, the present invention should be construed as limited by the appended claims which follow.

What is claimed is:

1. In a computer system including a floating point unit (FPU), an apparatus for reducing power consumption, comprising:

control and integer execution circuitry coupled to the FPU comprising a plurality of control registers that store a plurality of flag bits including an emulation bit, an active state of the emulation bit indicating that floating point operations must be emulated by the computer system; and power conservation logic coupled to the control and integer execution circuitry and to the FPU that outputs a clock signal to the FPU when the clock signal is active and the emulation bit is inactive, the power conservation logic comprising:
a delay circuit that delays the emulation bit; and
an AND gate with an input coupled to the clock signal, an input coupled to the output of the delay circuit, and an output coupled to a clock input of the FPU.

2. The apparatus of claim 1, wherein the plurality of flag bits further includes a task switch flag, an active state of the task switch flag indicating that tasks performed by the computer system are being switched, and wherein the power conservation logic outputs the clock signal to the FPU when the clock signal is active and the task switch bit is inactive.

3. In a processor, an apparatus that controls power used by a floating point unit (FPU), comprising:

a central clock device that generates a system clock signal;

a control and execution unit coupled to the clock device, comprising:
at least one control register that stores bits indicating conditions of the processor, including an emulation bit and a task switch bit, the emulation bit indicating that the processor must emulate floating point operation and the task switch bit indicating that the processor is switching tasks; and
a first OR circuit that generates a result of ORing the emulation bit and the task switch bit; and power conservation logic coupled to the control and execution unit and to the clock device that outputs an FPU clock signal when the system clock signal is active and the output of the first OR circuit is active the power conservation logic comprising:
a delay circuit that delays the output of the first OR circuit;
a second OR circuit that outputs a result of ORing an output of the delay circuit and the output of the first OR circuit; and
an AND circuit that generates the FPU clock signal from the output of the second OR circuit and the system clock signal.

4. In a computer system including a floating point unit (FPU), an apparatus for reducing power consumption, comprising:

control and integer execution circuitry coupled to the FPU comprising a plurality of control registers that store a plurality of flag bits including:
a task switch flag, an active state of the task switch flag indicating that tasks performed by the computer system are being switched, and wherein the power conservation logic outputs the clock signal to the FPU when the clock signal is active and the task switch bit is inactive; and
an emulation bit, an active state of the emulation bit indicating that floating point operations must be emulated by the computer system; and power conservation logic coupled to the control and integer execution circuitry and to the FPU that outputs a clock signal to the FPU when the clock signal is active and the emulation bit is inactive, the power conservation logic comprising:
a delay circuit that delays the task switch bit; and
an AND gate with an input coupled to the clock signal, an input coupled to the output of the delay circuit, and an output coupled to a clock input of the FPU.

* * * * *